Figure 1:
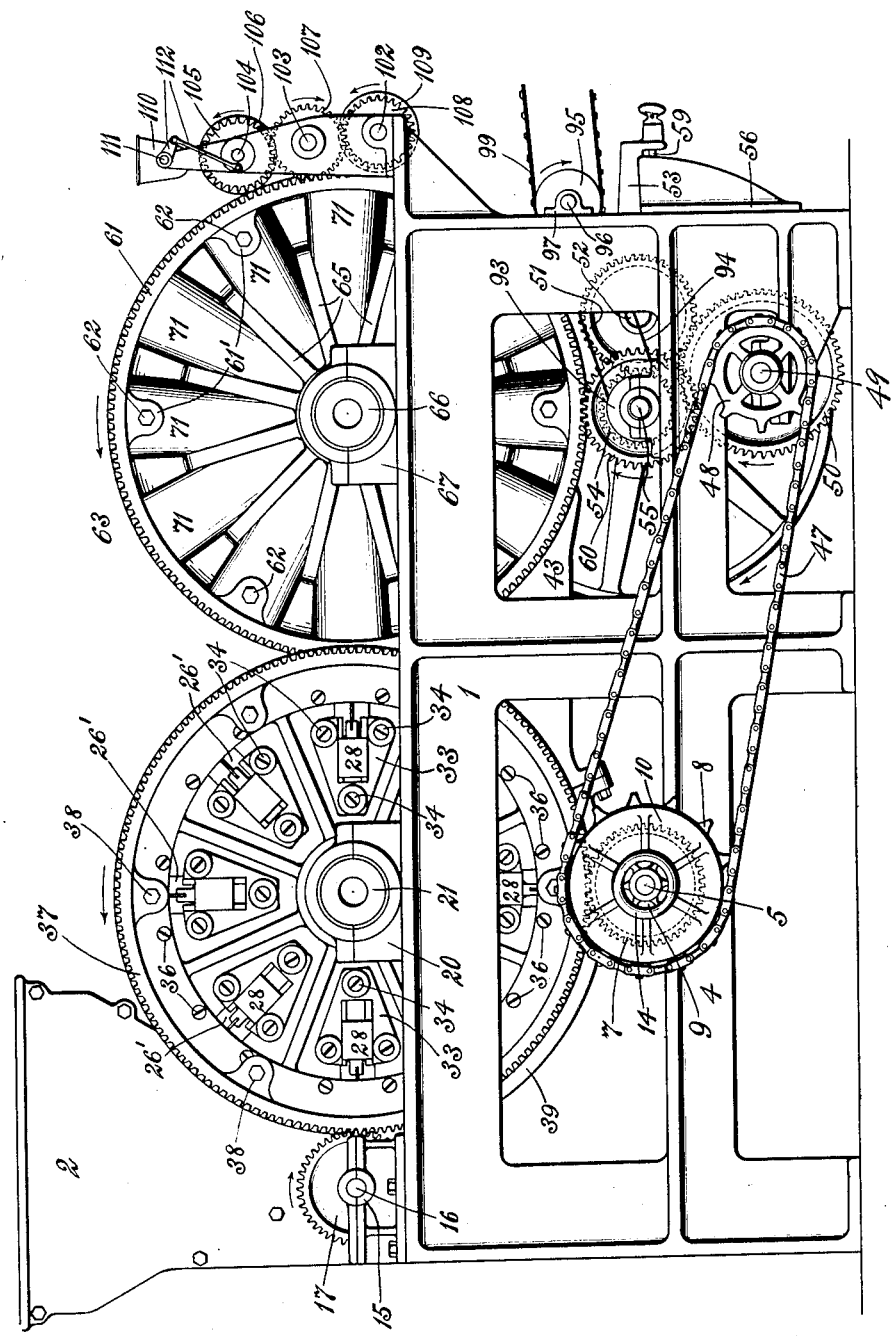

No. 888,412. PATENTED MAY 19, 1908.
C. A. THOMSON.
MACHINE FOR DIVIDING PLASTIC MATERIAL INTO CHARGES.
APPLICATION FILED MAR. 27, 1905.

3 SHEETS—SHEET 1.

Witnesses:
F. E. Anderson.
Frances E. Blodgett.

Inventor:
Charles A. Thomson,
By his Attorney,

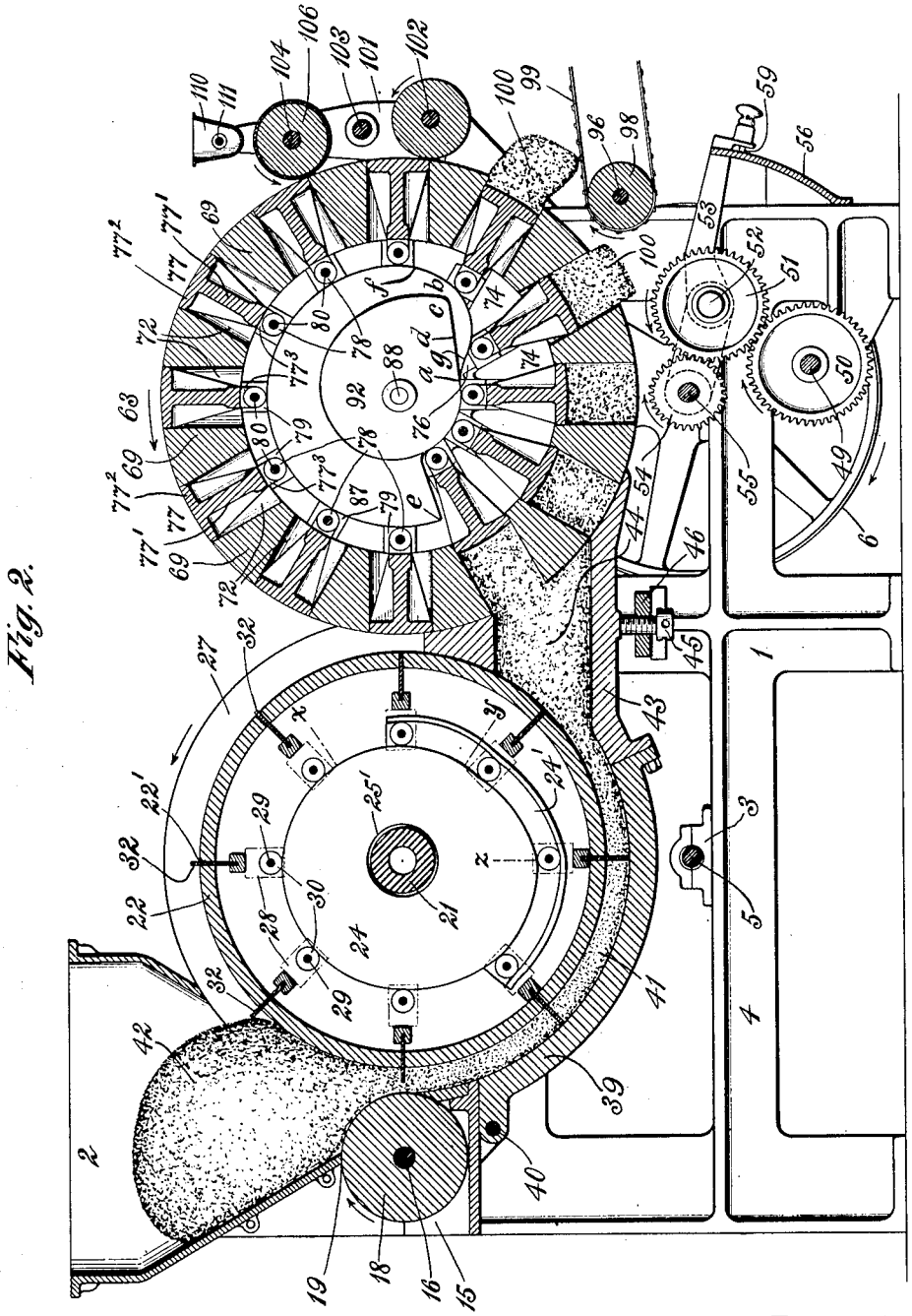

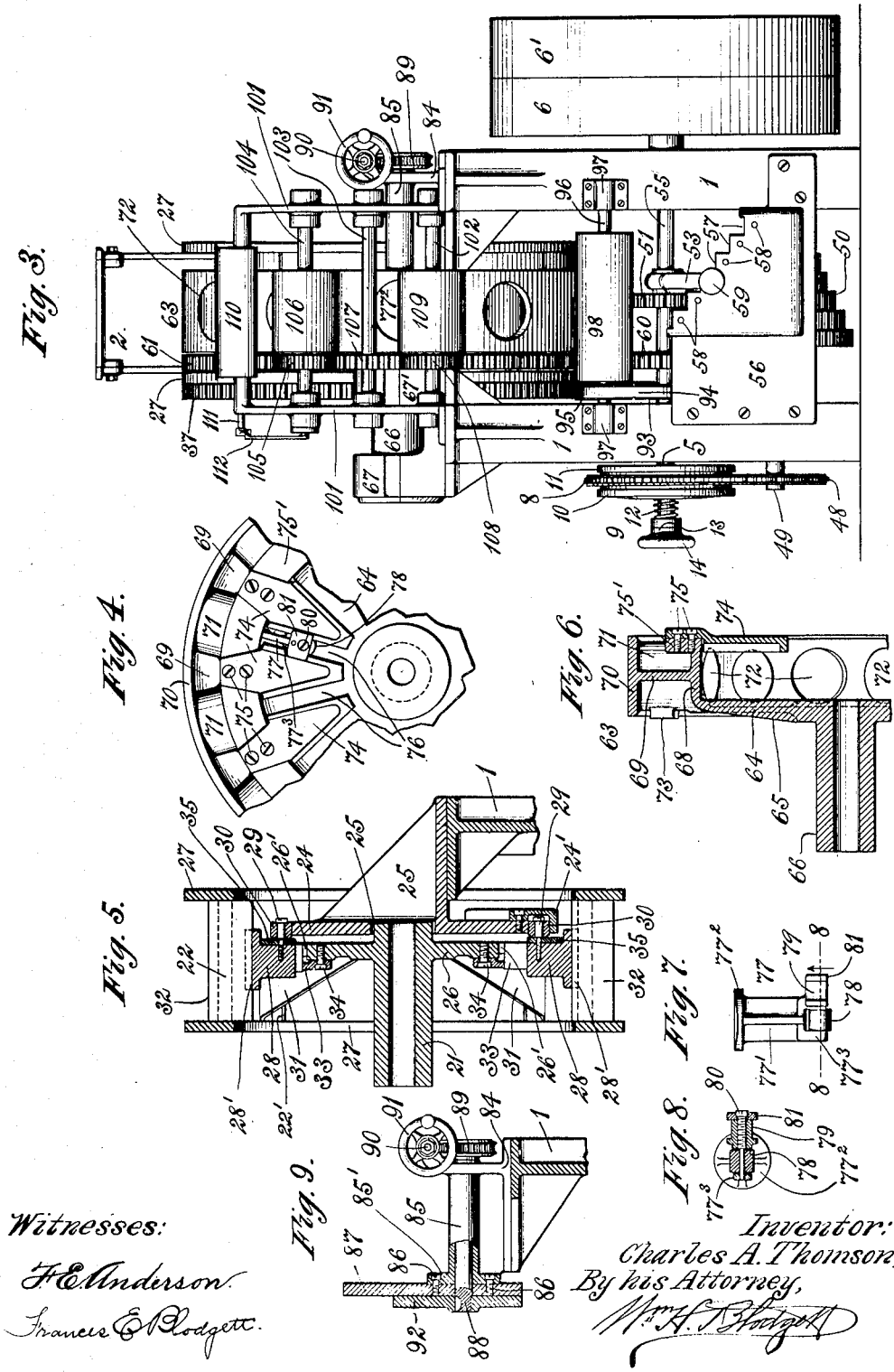

UNITED STATES PATENT OFFICE.

CHARLES ALLEN THOMSON, OF BELLEVILLE, NEW JERSEY, ASSIGNOR TO C. A. THOMSON MACHINE COMPANY, OF BELLEVILLE, NEW JERSEY, A CORPORATION OF NEW JERSEY.

MACHINE FOR DIVIDING PLASTIC MATERIAL INTO CHARGES.

No. 888,412.     Specification of Letters Patent.     Patented May 19, 1908.

Application filed March 27, 1905. Serial No. 252,214.

*To all whom it may concern:*

Be it known that I, CHARLES ALLEN THOMSON, a citizen of Scotland, Great Britain, residing at Belleville, in the county of Essex and State of New Jersey, have invented certain new and useful Improvements in Machines for Dividing Plastic Material into Charges, of which the following is a specification.

My invention has for its object the provision of machinery for feeding a mass of dough or other plastic material into the pockets of a rotary carrier, and for ejecting said mass, when thus formed into a block, from the pockets and depositing it upon an endless conveyer or other instrumentality.

A further object of the invention is the provision in connection with a hopper of feed-wheel, having a series of blades or plates passing through slots in its working periphery, and adapted to enter the material as it leaves the hopper and advance the same toward the carrier,—means being provided for projecting and withdrawing said blades or plates at the proper time.

A further object of the invention is the provision of a rotary carrier having a series of pockets in which charges of plastic material are received, and of pistons or discharge-plungers in said pockets, forced back by the charges successively received in the pockets, combined with means for gradually advancing each of said pistons to expel said charges from the pockets.

A further object of the invention is the provision of means for adjusting the pistons, so that measured charges each containing the same amount of plastic material, may be formed in the pockets.

A further object of the invention, is the provision of an adjustable cam, the position of which may be regulated to cause the desired location of the pistons in the pockets, and which cam is normally stationary.

A further object of the invention is the provision in connection with said adjustable cam, of a stationary cam located adjacent thereto, and having a peripheral contour of the required kind properly to actuate the pistons or discharge-plungers.

A further object of the invention is the provision in connection with the rotary carrier of a feed-wheel feed-blades passing through slots in the working periphery of said wheel, and a stationary cam-device for governing the position of the feed-plates.

A further object of the invention is the provision in connection with a rotary carrier and its pistons of a feed-device, and a fixture having a passageway for receiving material advanced by said feed-device and delivering it to the pockets of the rotary carrier.

Other objects of the invention will be hereinafter set forth.

In the accompanying drawings, Figure 1 is a side elevation of a machine constructed in accordance with my invention. Fig. 2 is a longitudinal vertical section of said machine. Fig. 3 is a rear end view of the machine. Fig. 4 is a view partially broken away of one side of the rotary carrier. Fig. 5 is a longitudinal vertical section of the feed-wheel and stationary cam detached,—a part of the frame being shown. Fig. 6 is a detached, fragmentary section of a portion of the rotary carrier, showing one of the guides for the discharge-pistons or plungers. Fig. 7 is a side view of one of said discharge-pistons or plungers; Fig. 8 is a sectional view on line 8—8 of Fig. 7, looking in the direction of the arrow. Fig. 9 is a detached view, partially in section and partially in elevation of the stationary cams for operating the discharge-plungers, and means for adjusting one of said cams.

Like numerals designate similar parts throughout the several views.

Referring to the drawings, the numeral 1 designates a machine-frame, which may be of any suitable kind and proportions, and the numeral 2 a hopper for the reception of plastic-material projecting from said frame.

Journaled in boxes 3 mounted on side rails 4 of the frame is a shaft 5 carrying a gear 7, and fitted loosely upon said shaft is a sprocket-wheel 8, attached thereto by a slip-connection (designated in a general way by 9) of any suitable variety, which will permit the sprocket-wheel to yield under excessive pressure. This slip-connection is shown consisting of a pair of disks 10, 11, one of which 11, is keyed to the shaft, while the other, 10, has a sliding connection therewith. Each disk is faced with leather, or equivalent material to afford frictional holding-surfaces, and between the disks the sprocket-wheel 8 is loosely mounted on the shaft. Pressure is applied to the disk 10 by a spring 12 surrounding the shaft, and the tension of this spring may be regulated by a nut 13 threaded upon the shaft, and carrying a hand-wheel 14, by which it may be manipulated, as shown in Fig. 3. Journaled in boxes 15 of the machine-frame is a shaft 16 carrying a gear 17, and a roller 18, the latter working through an opening 19 in the rear side of the hopper, as illustrated in Fig. 2. Also journaled in a pair of boxes 20 on the top of the frame is a shaft 21 and this shaft has rigid therewith a chambered feed-wheel 22 flanged at its sides as at 27. Located in the chamber of said feed-wheel is a stationary cam 24 having a periphery of peculiar form, for a purpose soon to be described. This cam 24 is shown integral with a bracket 25, secured to the top of the frame, and it is perforated at 25' to clear the end of the shaft 21, as shown in Fig. 5. Below said cam is a stationary cam-strip 24' between the inner surface of which and the periphery the rollers for actuating feed-plates hereinafter described are located.

As shown in Fig. 2 the periphery of cam 24 is concentric to its axis from $y$ to $x$, gradually increases in eccentricity from $x$ to $z$ and decreases in eccentricity between $z$ and $y$, for reasons hereinafter set forth. Cam-plate 24' also has an irregular contour, and it coöperates with the cam in actuating the feed-plates as will be hereinafter explained. As illustrated by said figures and by Fig. 1, the feed-wheel is composed of a web 26 rigid with the shaft 21, a periphery 22, shown as a ring integral with the circumference of the web, and side flanges, illustrated as rings 27. At intervals around its periphery the web 26 is slotted at 26' to receive slide-blocks 28, from each of which projects a screw-stud 29, carrying a roller 30, which rests upon the stationary cam 24, and at times is actuated by the cam-strip 24'. To reinforce the web it is provided with ribs 31 which extend up to, and aid in supporting, the periphery 22, said periphery being slotted at intervals at 22' to receive feed-plates 32 tightly fitted at their lower ends in grooves 28' of the slide blocks 28. Slotted plates 33 are attached to the web between each pair of ribs 31 by screws 34, and caps 35, serve to secure the slide-blocks 28 against displacement. Screws 36 secure the rings to the periphery 22, as shown in Fig. 1. In constructing the feed-wheel, the web, ribs and periphery are preferably formed as a single casting although each part may be a separate element if desired.

Designated by 37 is a gear-ring, which is secured to one of the rings 27 by bolts 28, and the peripheral teeth of said ring are in mesh with the gear 17, upon the shaft of which the roller 18 is carried.

Designated by 39 is a concave, pivoted at 40 to the machine-frame, and spaced the desired distance from the periphery of the feed-wheel 22 to form a passage-way 41 for the dough or other plastic-material 42, which is placed in the hopper 2, is fed forward by the rollers 18, feed-wheel 22 and blades 32, and is rolled out or reduced in the manner illustrated in Fig. 2, by said feed-wheel, roller and concave. Bolted or otherwise secured to the inner end of the concave 39 is a fixture or mouth-piece 43, curved at its sides to fit snugly between the rotary carrier hereinafter described and the periphery of the feed-wheel 22. This fixture constitutes an extension of the concave 39, and said fixture is provided with a chamber or passage-way 44, into which the material is fed by the wheel 22 and its blades 32, as illustrated in Fig. 2. To cause a sufficiently tight fit between the feed-wheel and rotary carrier the fixture 43 is supported on a screw 45, threaded into a cross-bar 46, of the frame, and inasmuch as the concave to which the fixture 43 is attached or may form an integral part is pivoted at 40 to the frame, it is obvious that by adjusting the screw 45 said fixture may be forced upward to cause the desired closeness of fit between it and the feed-wheel and carrier.

Designated by 47 is a sprocket-chain in engagement with the teeth of the sprocket-wheel 8, said chain being driven by a sprocket-wheel 48, rigid with the end of a shaft 49 journaled in the sides of the frame. On said shaft may be keyed variable speed gearing 50, any element of which may be engaged by a swinging idler-pinion 51, mounted on a stud 52 carried by an arm 53, said arm being sleeved on the hub of a gear 54, slidingly connected to a driving-shaft 55, journaled in boxes of the side-frames, and carrying usual fast and loose pulleys 66'. A plate 56 connecting the side-frames is provided intermediate its ends with a series of steps 57 to receive the arm 53, and below said steps with perforations 58, in any of which a locking-pin 59 may be entered to secure said arm 53 in its desired position of adjustment. Rigid with the shaft 55 is a gear 60 and said gear is in mesh with the teeth of a gear-ring 61, secured by bolts 62 to the side of a rotary carrier, designated in a general way by 63,— the arrangement of gearing being such that the carrier rotates in the same direction as the feed-wheel 22, as shown by the arrows in Fig. 1.

A section of the rotary carrier is illustrated in Fig. 6, and it is composed of a web 64, having stiffening ribs 65 upon one side, a shaft 66, preferably tubular, projecting from the ribbed side, and journaled in boxes 67, 67' on the top of the frame, as shown in Fig. 3, a circumferential, inwardly-extending flange 68, projecting from the top of the web, vertical ribs 69, a top flange or periphery 70, and a series of circular bosses 71, braced by the ribs 69, and in which are formed pockets 72 for the reception of the charges of plastic-material and which pockets, although shown of circular outline, may be of any desired form, said parts of the carrier preferably constituting a single casting. A flat bearing-face 73 is formed on every other tubular boss 71 for the reception of the screw-bolts 62, which pass through lugs 61' of the gear-ring 61, and are threaded into nuts of the bearing-faces, to secure said gear-ring in place.

Fitted upon the side of the carrier are plates 74, attached by screws 75 to a perpendicular projection 75' of the flange 68,—said plates having finished sides and surfaces and being so shaped as to form radial slots 76 for the reception of slide-blocks 79 which are formed integral with a plunger or piston 77 one of which is shown detached in Fig. 7.

Fitted in each pocket 72 is one of these plungers 77, each plunger having a ribbed body 77', a head 77² conforming to the shape of the pocket, and a bifurcated lower end 77³, in which an antifriction-roller 78 is journaled. Secured in place by dowel pin and a bolt 80, upon which the roller 78 is mounted, is a cap-plate 81 serving to retain the slide-blocks 79 in the guideways formed by the plates 74.

Referring to the Fig. 9, the numeral 84 designates a stand bolted to the top of one of the side-frames, and having a long bearing 85 at its inner end as at 85'. Secured to the flange 85' by screws 86 is a stationary cam 87, and journaled in the bearing 85 is a shaft 88, carrying at its outer end a worm-wheel 89 in mesh with a worm 90 which may be turned by a hand-wheel 91. Keyed to the inner end of the shaft 88 is a cam 92, said cam having a periphery gradually increasing in eccentricity from the point $a$ to the point $b$ where it terminates in a nose $c$, and then abruptly recedes in a substantially straight line $d$ to the point $a$. Cam 87 has a concentric periphery from the point $f$, and between said point $f$ and the point $g$ it has a gradually-rising periphery, terminating in the concentric portion between the points $e$ and $f$. In function these cams serve to control the movement and adjust the position, of the plungers 77, as will be hereinafter described.

A pulley 93 is carried by the shaft 55, and a belt 94 extends from said pulley to a like pulley 95 carried by a shaft 96 journaled in boxes 97 secured to the end of the frame. Mounted on said shaft is a drum 98 for actuating an endless belt 99 for carrying the blocks or charges 100, expelled from the pockets, to any desired point, for instance, to a molding-machine in which the blocks are reduced to loaves of dough ready for the oven.

Designated by 101 are standards rising from the top of the machine-frame, and in these standards are journaled a series of shafts 102, 103, and 104, the latter carrying a pinion 105, and a felt-covered roller 106. On the shaft 103 is a pinion 107 meshing with the pinion 105 and also in engagement with a pinion 108 on shaft 102, the latter carrying a roller 109 which serves to dislodge the blocks or charges 100, should they, or any of them, adhere to the carrier, as illustrated in Fig. 2—above the felt-covered roller 106 is a receptacle 110 for vegetable-oil, flour or other material, said receptacle having a perforated bottom, and containing an agitator secured to a shaft 111, actuated by crank and link connections 112 from the shaft 104, as illustrated in Figs. 1 and 3.

In the operation of my improved machine a mass of dough or other plastic material 42 is placed in the hopper 2, and the machine is set in motion by shifting the belt (not shown) from the loose pulley 6' to the fast-pulley 6, when, gear 54 having been locked in engagement with the desired member of the variable speed-gearing 50, the feed-wheel 22 and carrier 63 are driven in the same direction by the gearing described, as indicated by the arrows in Figs. 1 and 2. As the feed-wheel rotates, the anti-friction rollers 30 travel upon the periphery of the stationary cam 24. Between the points $z$ and $y$ the conformation of said cam, and the cam strip 24' is such that as a roller 30 passes between them the plate 32 actuated by said roller will be withdrawn until the end thereof is flush with the periphery 26 of the feed-wheel, and this position of the plate is maintained until said roller arrives at about the point $x$, when it will gradually be forced outward by the increasing rise of said periphery to advance the feed-plate to its full extent, as illustrated in Fig. 2. When each plate reaches the plastic-material in the hopper 2 it engages the same and forces an increment thereof downward, the mass being then seized by the feed-roll 22 and roller 18, rolled between the two, and carried into the concave 39, the feed-plates assuming their fully-projected positions through the material while it is passing through the channel between the periphery of the feed-wheel and concave. After leaving the concave the material enters the chamber of the fixture 43 under feed-pressure, fills the same, and successive charges thereof are then received in the pockets of the rotary carrier 63, forcing back the pistons in said pockets as far as permitted by the cam 92 which has been adjusted to limit the retreat of said pistons, so that each will permit only an exact regulable amount of said material to enter said pockets. As the carrier rotates the pockets are successively filled, and charges are divided from the mass under feed-pressure in the chamber 44 of the fixture. Leaving the cam 92 the rollers 78 of the pistons 77 engage the cam 87 at about the point $g$ of its periphery, and are gradually forced outward to expel the charges, which drop upon the conveyer 99. Should the charge adhere to the carrier from any cause it will engage the roller 109, which, rotating in the direction of the arrow in Figs. 1 and 2, will throw it downward upon said conveyer.

As each piston travels beneath the roll 109, it is also crowded backward until the outer surface of its head is on the same line as the periphery of the carrier 63, and each then passes beneath the absorbent or other periphery of the roll 106, which applies a coating of vegetable oil or other lubricant to its surface, said lubricant preventing adherence of the charge in the pocket to the piston.

As will be seen by referring to Figs. 1 and 2, the doffer-roll 109 and the lubricating-roll 106 rotate in the same direction, each being driven by the pinion 107 in mesh with the teeth of the gear-ring 61, as before stated.

To adjust the positions of the pistons each to an exact place in the pockets of the rotary carrier so that charges of like weight and size may be formed, and to control the manufacture of said charges as desired, the cam 92 is turned by the worm 90 and worm-wheel 89, as above set forth.

As will be evident from the above description the rotary carrier 63 is driven at a constant speed, while the speed of the feed-wheel may be regulated to suit requirements. In dividing small charges from the mass the pinion 51 will be adjusted to engage a member of the gear-cone 50, which will impart a slower movement to the shaft 49, sprocket-wheel 48, chain 47, and shaft 5, while with larger charges said pinion will be intermeshed with a gear of size sufficient to impart a more rapid speed to the feed-wheel. In this manner a machine is provided capable of producing charges each of any desired size and weight, so that it is practically universal for the purpose intended. Should there be clog or obstruction to the passage of the material advanced by the feed-blades, breakage of any of the parts is prevented by the slip-connection described, and by regulating the tension of spring 12, control of the pressure of the plastic material in the concave 39 and passage 44 of the fixture or mouth-piece 43 may be regulated as desired, said connection yielding should the pressure become excessive. In virtue of this slip-connection the sprocket-wheel may be driven at any desired speed in the manner described, the friction-disks 10 and 11 of shaft 5 permitting a certain amount of slip, so that the material will not be subjected to excessive pressure in the fixture or mouth-piece 43, as the blank spaces between the pockets in the periphery of the carrier pass the end of the mouth-piece.

By means of the frictionally-held sprocket-wheel, which permits a slip when the material is opposite the blank spaces of the carrier or dividing-drum, the feed-wheel will start up quickly when the material finds relief, as the pockets of the carrier come into line with the feed-passage of the mouth-piece, and said feed-wheel will then rotate more rapidly to overcome the reduction in pressure, and so on while the machine is in operation.

Other means for permitting this slip of the gearing for driving the feed-wheel, and gearing of various kinds for operating said feed-wheel may be employed without departure from the invention.

From the above description it will be seen that the size of the blocks or charges produced by the machine may be regulated at will, and that said charges when expelled from the pockets will each contain the same amount of material and will each be of the same weight—important desiderata when the machine is employed for dividing dough.

While the feed-wheel and carrier are in the exemplification given driven by gearing to rotate them in the same direction this is immaterial, for in some instances they may be driven in opposite directions, and the hopper may be differently disposed without departure from the invention.

While variable speed gearing is illustrated for actuating the feed-wheel, this may be omitted, and said elements driven by any suitable means and in any desired way without departure from the invention, which is not limited to the arrangement and proportions of parts, or to the horizontal dispositions of said parts shown and described.

Pockets of any desired shape may be formed in the rotary carrier, the invention not being limited to the circular pockets shown, and the manner of constructing said feed-wheel and carrier may be varied within wide limits without departure from the invention. So too, other means may be substituted for those shown for feeding material to the pockets of the carriers, the invention not being limited in this respect.

Having thus described my invention, what I claim is—

1. The combination, with rotary pocket and feed-wheels, of a hopper; movable blades carried by the feed-wheel for seizing material from the hopper and forcing it into the pockets of the pocket-wheel; means for actuating said blades; an enlarged passage coöperating with the feed-wheel, and leading to the pocket-wheel; and means for expelling the charges from said pockets.

2. The combination, with a rotary feed-wheel, of means for delivering material to said wheel; feed-blades carried by the feed-wheel; means for advancing and retracting said feed-blades; a rotary carrier having pockets; a fixture having an enlarged passage coöperating with the feed-wheel, and leading to the rotary carrier; and means for expelling charges of material from said pockets.

3. The combination, with framework, of a rotary carrier journaled therein, said carrier having pockets; a bearing secured to the framework; a stationary cam rigid with the bearing; a shaft journaled in the bearing; a cam for regulating the position of the pistons secured to said shaft; and means for turning the shaft.

4. The combination, with framework, of a rotary carrier journaled therein, said carrier having pockets; a bearing secured to the framework; a stationary cam rigid with the bearing; a shaft journaled in the bearing; a cam for regulating the position of the pistons secured to said shaft; means for turning the shaft; a gear-wheel secured to the end of the shaft opposite the cam; and means for actuating said gear-wheel.

5. The combination, with framework, of a rotary carrier having pockets journaled in said framework; discharge-pistons in said pockets; a standard rigid with the framework, and having a tubular bearing; a stationary cam for actuating the pistons rigid with the inner end of said bearing; a shaft mounted in the bearing; a cam for regulating the position of the pistons attached to the end of said shaft adjacent to said stationary cam; a worm-wheel on the shaft; and a worm for turning said shaft.

6. The combination, with a rotary carrier having pockets, of discharge-pistons in said pockets; means for actuating said pistons; a gear on the carrier; a pinion; a gear in mesh with said pinion; a lubricant-roll; and a doffer-roll actuated by the pinion.

7. The combination, with framework, of a rotary carrier having pockets; pistons in the pockets; means for actuating the pistons; a gear rigid with the carrier; standards on the framework; a pinion journaled in said standards; a lubricant-carrying-roll driven by the pinion; and a doffer-roll also driven by the pinion.

8. The combination, with a hopper for receiving material, of a feed-wheel; blades carried by the feed-wheel; a stationary cam for actuating said blades; a rotary carrier having pockets; pistons loosely mounted in said pockets, and retracted by the pressure of the material when it successively enters the pockets; a stationary cam for actuating the pistons; and lubricant and doffer rolls driven by the carrier.

9. The combination, with a feed-wheel having a periphery provided with a series of slots, of feed-blades passing through said slots; means for actuating the feed-blades; means for supplying material to be acted upon by the feed-blades; a rotary carrier having pockets; pistons in the pockets, said pistons being retracted by material entering said pockets; means for actuating said pistons for expelling material from the pockets; and lubricant and doffer rolls driven by the carrier.

10. The combination, with a feed-wheel having slots in its periphery, of a hopper in which material is placed; feed-blades passing through said slots; a stationary cam for projecting said feed-blades to advance the material; a rotary carrier having pockets; pistons in said pockets; a stationary cam for actuating the pistons to eject charges from the pockets; and a fixture intermediate the feed-wheel and carrier, said fixture having an enlarged passage into which material is delivered by the feed-blades.

11. The combination, with a feed-wheel having slots in its periphery, of feed-blades working in said slots; means for advancing and retracting said feed-blades; a concave coöperating with the feed-wheel; a rotary carrier having pockets into which material is forced by the feed-blades; a device having a passage-way, and located between the feed-wheel and carrier; and means for ejecting charges of material from said pockets.

12. The combination, with a feed-wheel, of devices carried by said feed-wheel for engaging material; means for advancing and withdrawing said devices; a device having a passage through which material is fed by said feed-wheel; a rotary carrier having pockets, said carrier serving to divide charges from the mass advanced by the feed-wheel; and means for expelling the charges from the pockets of the carrier.

13. The combination, with a feed-wheel, of devices carried by said feed-wheel for engaging material; means for actuating said devices; a concave coöperating with the feed-wheel; a fixture having an enlarged passage for receiving material delivered by the feed-wheel; and means coöperating with said fixture for dividing charges of material from the mass in the passage of said fixture.

14. The combination, with a feed-wheel having slots in its periphery, of feed-blades passing through the slots; means for advancing and retracting said feed-blades; a concave to which material is supplied, said concave coöperating with the periphery of the feed-wheel to reduce the material; a fixture having an enlarged passage for receiving material fed from the concave; a device having pockets for dividing charges from the mass of material in the fixture; and means for ejecting the charges from the pockets.

15. The combination, with a feed-wheel having slots in its periphery, of feed blades; a stationary cam for projecting said feed-blades; a stationary cam coöperating with the other cam for withdrawing said feed-blades; means for supplying material to be acted upon by the feed-blades; a carrier having pockets into which the material is forced by the feed-blades; pistons in said pockets; means for actuating the carrier to divide successive charges of material from the mass; and means for successively-actuating the pistons.

16. The combination, with a hopper, of feed- and pocket-wheels, devices on the feed-wheel for advancing material from the hopper; a device having an enlarged passage, and leading to the pockets of the pocket-wheel; means for projecting and withdrawing said devices on the feed-wheel; pistons in the pockets of the pocket-wheel; and means for actuating said pistons, to cause them to eject the charges from said pockets.

17. The combination, with a hopper, of feed and pocket-wheels, devices on the feed-wheel for advancing material from the hopper to the pockets of the pocket-wheel; a device intermediate the feed and pocket-wheels, and having a passage; means for projecting and withdrawing said devices on the feed-wheel; pistons in the pockets of the pocket-wheel; means for actuating said pistons, to cause them to eject the charges from said pockets; and means for adjusting the pistons to vary the depth of the pockets.

18. The combination, with a hopper, of feed and pocket wheels, devices on the feed-wheel for advancing material from the hopper to the pockets of the pocket-wheel; means for projecting and withdrawing said devices; a fixture having an enlarged passage; pistons in the pockets of the pocket-wheel; means for actuating said pistons, to cause them to eject the charges from said pockets; and a cam for adjusting the pistons to vary the depth of the pockets.

19. The combination, with a hopper, of a feed-wheel having a slotted periphery; feed-blades passing through the slots of the periphery; means for advancing and withdrawing said feed blades; a roller coöperating with said periphery to reduce the material; a concave also coöperating with said periphery; a fixture having an enlarged passage; a pocket-wheel for dividing material projected through said passage; and means for ejecting charges from the pockets of the pocket-wheel.

20. The combination, with means for supplying material, of a rotary feed-wheel; feed-blades carried by said feed-wheel; means for gradually projecting and then withdrawing said feed-blades; a fixture having an enlarged passage; a rotary carrier having pockets into which the material is forced from said passage by said feed-blades; sliding pistons having heads in said rotary carrier; and means for projecting said pistons to expel the charges from the pockets and cause the heads of the pistons to lie flush with the periphery of the carrier.

21. The combination, with a feed wheel having a web, a shaft rigid with said web, and a slotted periphery, of a frame; bearings on said frame in which the shaft is journaled; blocks mounted in guides of the web; feed-plates carried by the blocks, and passing through the peripheral slots of said feed-wheel; cams for projecting and withdrawing said blocks; an enlarged passageway into which material is forced by said feed-plates; and means for dividing charges from the material in said passageway.

22. The combination, with a feed-wheel having a web, a shaft rigid with said web, and a slotted periphery, of a frame; bearings on said frame in which the shaft is journaled; blocks mounted in guides of the web; feed-plates carried by the blocks, and passing through the peripheral slots of said feed-wheel; cams for projecting and withdrawing said blocks; an enlarged passageway into which material is forced by said feed-plates; means for dividing charges from the material in said passageway; and means for conveying the charges.

23. The combination, with a hopper, of a feed-wheel having slots in its periphery; feed-blades working in the slots; means for projecting the blades before they reach the material in the hopper; a fixture having an enlarged passage; a pocket-wheel, the pockets of which receive material advanced by said blades; a stationary cam for withdrawing the blades when they advance to a line opposite the pocket-wheel; and means for ejecting charges from said pockets.

In testimony whereof I affix my signature in presence of two witnesses.

CHARLES ALLEN THOMSON.

Witnesses:
JNO. J. HOPPIN,
BENJAMIN F. JONES.